May 29, 1934. J. W. WHITE 1,960,469
WHEEL
Filed March 5, 1929 2 Sheets-Sheet 1

Inventor
JOHN WILLIAM WHITE
by Roberts Cushman & Woodbury
Attorney

May 29, 1934.  J. W. WHITE  1,960,469

WHEEL

Filed March 5, 1929  2 Sheets-Sheet 2

Inventor
JOHN WILLIAM WHITE by
Roberts, Cushman & Woodbury
Attorney

Patented May 29, 1934

1,960,469

UNITED STATES PATENT OFFICE 1,960,469

WHEEL

John William White, Buffalo, N. Y., assignor to Kelsey-Hayes Wheel Corporation, Detroit, Mich., a corporation of New York Application March 5, 1929, Serial No. 344,257

2 Claims. (Cl. 301—9)

This invention relates to an improvement in wheels and more particularly in wheels of the interchangeable and demountable type and in the means for mounting such wheels upon the vehicle.

Wheels of the type mentioned comprise briefly a rim to receive the tire, a hub shell to engage a hub and means connecting the rim and shell. The hub may be mounted upon a vehicle either being suitably connected to a vehicle axle to receive a functioning wheel or being a dummy hub to receive a spare wheel.

It is quite customary to secure the wheel to the hub by means of bolts projecting axially from the hub and nuts which engage the bolts. The bolts, when the wheel is assembled with the hub, pass through suitably arranged apertures provided in the hub shell, usually a flange, so that when the nuts are tightened the wheel and hub are secured in assembly. When the bolts are outside the body of the hub shell no particular difficulty is experienced in applying the nuts. When, however, the body of the hub shell is increased in diameter and the bolts extend into the interior of such hub shell, it is difficult to apply the nuts properly to the bolts. The present tendency is toward increasing the diameter of the body of the hub shell of wheels, and in view of such increase in diameter, to introduce the bolts into the interior of the hub shell body instead of passing these bolts through perforations in a flange which extends outwardly from the shell.

Furthermore it sometimes happens that one or more of the nuts becomes loosened upon its bolt due to friction or jarring. When the nuts and bolts are outside the hub shell this loosening can be quickly noted and easily corrected. When, however, the nuts and bolts are inside the hub shell it is not easy to discover this condition nor is it particularly easy to correct it.

The primary object of this invention is to provide a wheel of the bolted-on driven type, having in place of the usual bolts and nuts studs which extend into the interior of the wheel hub shell, and a single nut by which the wheel is secured in the assembled position so that the increase in diameter of the hub shell is obtained and the difficulties mentioned avoided.

A further object of this invention is to provide means to prevent any loosening of the single nut which might result from vibration or jarring to both of which actions the wheels upon a vehicle are particularly exposed.

A still further object of this invention is to provide a cap for the hub shell and means for quickly mounting or demounting such cap when occasion arises. Another object of this invention is to provide driving studs for wheels of this character which studs are so constructed that they can be used to secure wheels of wood, wire or disc types without any change.

Other objects will appear from a consideration of the following specification taken in connection with the drawings which form a part thereof and in which, Fig. 1 is a side elevation partly in section of a wheel embodying this invention mounted upon an axle and freely rotatable relatively thereto;

Figure 1:
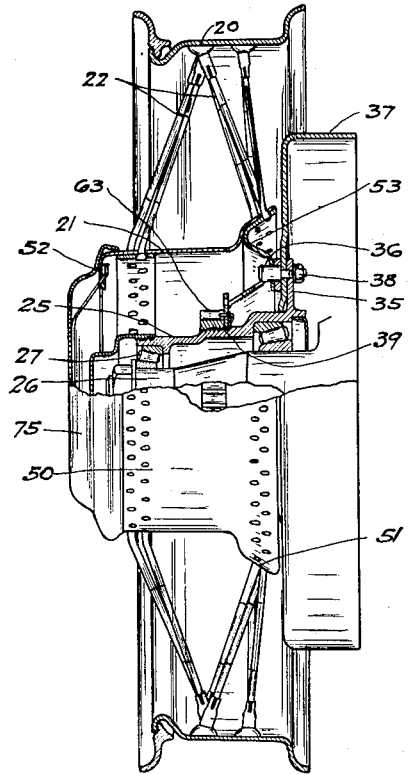
Figure 2:
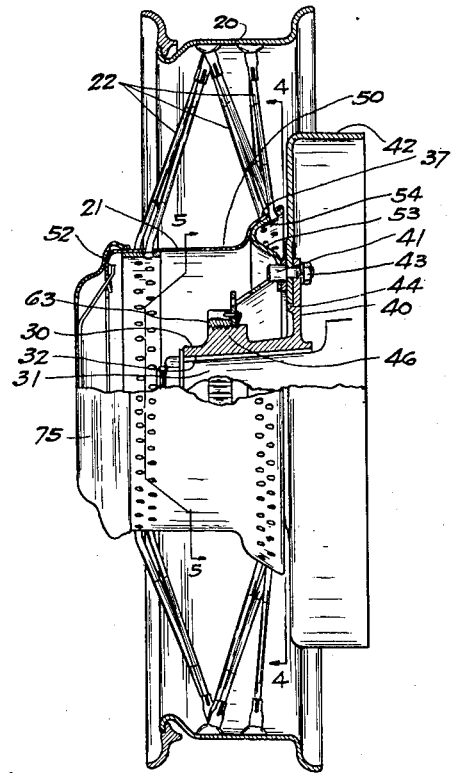
Fig. 2 is a view similar to Fig. 1 of a wheel embodying this invention mounted upon and driven by an axle.
Figure 3:
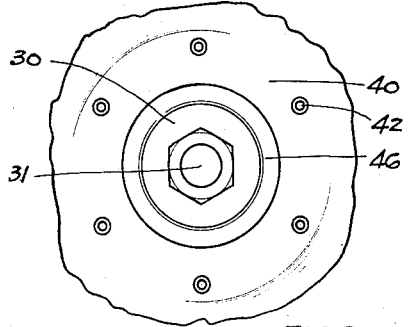
Fig. 3 is an end elevation of the wheel hub shown in Fig. 2.
Figure 4:
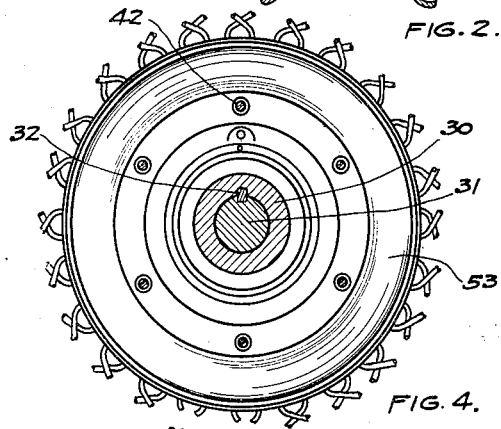
Fig. 4 is a sectional view taken along the lines 4—4 of Fig. 2.

This invention is illustrated as incorporated in a wheel having a rim 20, a hub shell 21 and suitable means which engage the shell and the rim and connect the two together in the proper manner, a plurality of wire spokes 22 being here shown as an exemplification thereof. In accordance with the usual practice the wheel comprising the rim, shell and spokes is adapted to be mounted upon a hub which may be carried by the projecting end of an axle or which may be a dummy hub for a spare wheel. In Fig. 1 the wheel is shown mounted upon an inner hub 25 which is carried by an axle 26, being freely rotatable relative thereto by means of anti-friction bearings 27. The wheel illustrated in Fig. 2 is mounted upon an inner hub 30 which is carried by an axle 31 being fixed against rotation relative to the axle by a key construction 32. It will be understood also that the wheel here shown can be mounted upon a dummy hub (not shown) having the same external contour as the hubs 25 and 30.

The hubs 25 and 30, while differing internally due to the manner in which they are connected to the axle are made with the same external contour so that the same wheel can be mounted upon either hub. The hub 25 has an inner flange 35 from which a circular series of studs 36 project axially. According to the usual practice a brake drum 37 is secured to the flange 35 by nuts 38 which engage the inner threaded ends of the studs 36. The hub 30 is provided with an inner flange 40 from which a circular series of studs 41 project axially and to which a brake drum 42 is secured by nuts 43 which engage the inner threaded ends of the studs 41. As shown in Fig. 2 the flange 40 may bear on its outer face an annular shoulder 44 on which the inner periphery of the brake drum 42 rests. The hub 25 is also provided with an externally threaded portion 39 intermediate its length and the hub 30 is similarly provided with an intermediate peripherally threaded portion 45. Due to the difference in diameter of the hubs the portion 45 of the rear hub 30 includes a flange 46 so that the diameters of the threaded peripheries of the portions 39 and 45 are identical. The flanges 35 and 40 are preferably but not essentially the same in diameter and in all events the studs 36 and 41 are similarly located and arranged.

Figure 5:
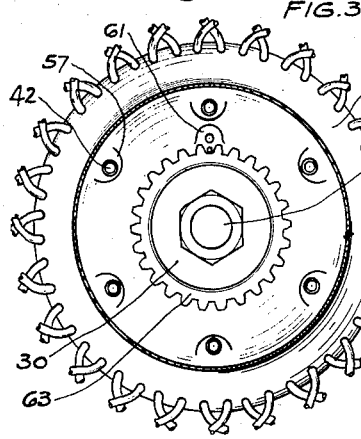
Fig. 5 is a sectional view taken along the lines 5—5 of Fig. 2.
Figure 6:
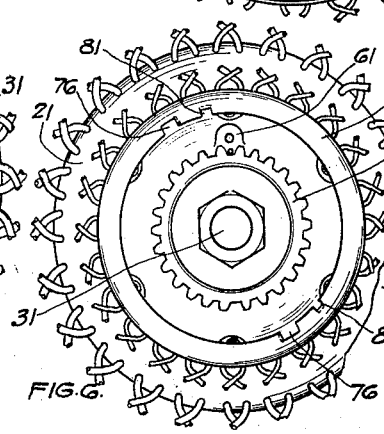
Fig. 6 is an end elevation of a wheel mounted upon a hub, the cap of the shell being removed.
Figure 7:
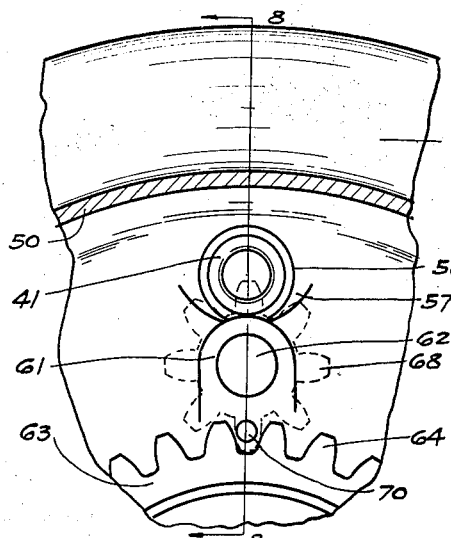
Fig. 7 is an enlarged detail view of a portion of a wheel illustrating in dotted lines the position of the means by which the single nut is rotated.

The hub shell 21 preferably comprises a tubular body portion 50 having its inner end 51 expanded to form a recess and provided at its outer end with an internally extending flange 52. Seated in the expanded portion 51 at the inner end of the shell is a ring 53 which as shown in enlarged cross section in Fig. 8 has a U-shaped portion 54 and an inner inclined portion 55 extending outwardly from the portion 54. The outer wall 56 of the U-shaped portion rests against the inner surface of the inner end 51 of the shell and is rigidly secured thereto by welding or other means. The spokes 22 which extend from the rim to the inner end of the hub shell are passed through the portion 56 as well as through the shell itself. Tongues 57 are stamped out of the inclined portion 55 at regular intervals, provided with perforations 58 and so located and arranged that when the wheel is assembled upon a hub the studs 36 or 41, as shown in Fig. 5, will pass through the perforations. Welded or otherwise rigidly secured to the tongues 57 are rings 59 which act to reinforce the tongues 57, doubling their thickness and providing an additional surface which engages the studs 41 or 36. The inclined portion 55 terminates at its inner edge in a flange 60 which defines an opening substantially corresponding to the external periphery of the threaded portions 39 or 45. A tongue 61 struck out from the inclined portion 55 forms an outer extension of the flange 60, and is provided with an aperture 62 for a purpose to be described later.

Figure 8:
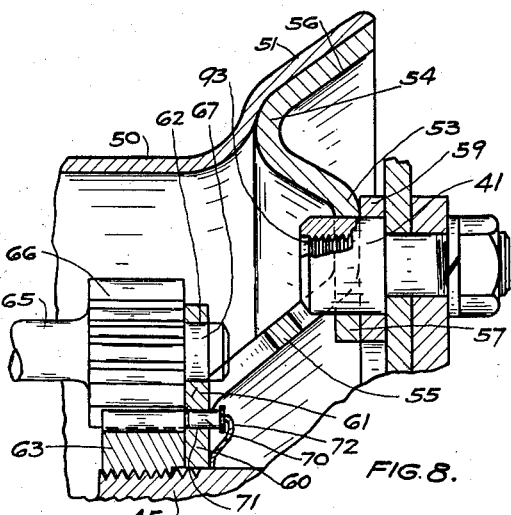
Fig. 8 is a sectional view taken along the line 8—8 of Fig. 7.
Figure 9:
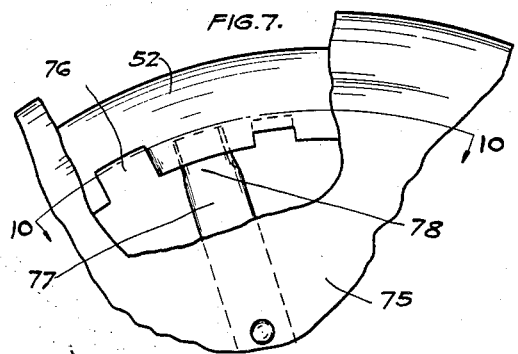
Fig. 9 is a partial end elevation on a large scale of a wheel embodying this invention, a portion of the cap being removed in order to disclose the operating mechanism.

The hub shell 21 is so formed that when the wheel is assembled with a hub 25 or 30 the perforations 58 in the tongues 57 will receive the studs 36 or 41 and the flange 60 will be located at the externally threaded intermediate hub portion 39 or 45. The wheel is secured in such position by a nut 63 engaging the portions 39 or 45 and having in its outer periphery a series of teeth 64. The nut 63 bears upon the outer face of the flange 60 and when tightened into the final position secures the wheel in place on the inner hub, as shown in Figs. 1, 2 and 8 particularly. The nut 63 is within the body portion of the shell and in order to operate it easily a special tool is provided. This tool comprises a shaft 65 and a gear 66 so mounted thereon that the inner end 67 of the shaft projects beyond the gear. The teeth 68 of the gear are adapted to intermesh with the teeth 64 on the nut. The inner end 67 of the shaft enters the aperture 62 in the tongue 61 and thus holds the gear 66 in mesh with the nut 63. The outer end of the shaft 65 may be formed in any desired manner to facilitate the rotation of the shaft. By rotating the shaft 65 and gear 66 it obviously follows that when the parts are located, as shown for instance in Fig. 8, the nut 63 is rotated either to secure the wheel upon the hub or to relieve it so that it can be removed.

In order to secure the nut against involuntary loosening, a pin 70 is provided which extends through an aperture 71 in the flange 60 adjacent the tongue 61. The pin 70 is normally projected outwardly from the flange 60 by a spring 72 or similar means and will enter the space between any two teeth 64 on the nut 63. When the gear 66 of the tool is introduced into mesh with the teeth 64 of the nut, the tooth 68 entering the space occupied by the pin 70 bears against it and depressing it against the action of the spring 72 removes it from engagement with the nut 63. When the tool is removed the pin 70 will, if the nut 63 is so located, snap into the space between two of the teeth 64 but if, as sometimes happens, a tooth 64 is over the pin the latter will not function until the nut is shifted either by reinserting the tool or by operating vibrations.

Figure 10:
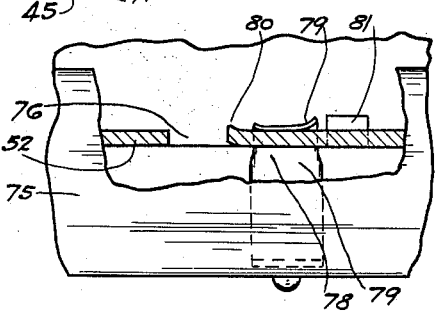
Fig. 10 is a sectional view taken along the line 10—10 of Fig. 9.

The opening at the outer end of the shell is closed by a cap 75 which extends over and covers the flange 52 and is locked in place by its engagement therewith. In the inner edge of the flange 52 are formed diametrically opposed recesses 76 with which the tips of spring clips 77 secured to the inner face of the cap 75 engage. The clips 77 may be separate or may be part of the same strip, if desired, the tips 78 however being diametrically opposed. The tip 78 of each clip 77 is so formed that it will enter one of the recesses 76 when the cap is put in position. One edge 79 of the tip is preferably bent, as shown in Fig. 10, and the portion of the flange 52 forming one edge of each recess 76 is preferably bent inwardly, as shown at 80 in Fig. 10. Adjacent each of the depressions 76 an integral tongue 81 is thrown back so that, as shown in Fig. 10, when the clip 77 is in the functioning position it rests between the portion 80 of the flange and the tongue 81. The tongue 81 positively prevents any further rotation of the cap in one direction and the tip 80 prevents the cap from loosening voluntarily in the other direction. The tongues 81 are so arranged relative to the recesses 76 that one tongue acts when the cap is turned in one direction upon mounting and the other tongue acts when the cap is turned in the other direction.

Figure 11:
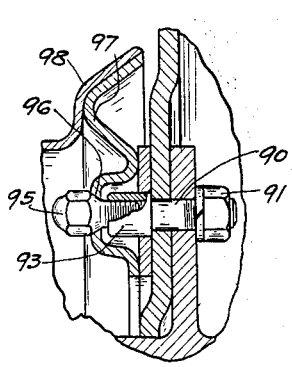
Figs. 11, 12 and 13 are detail views illustrating the applicability of the driving studs, which form a feature of this invention, to wire, disc or wood wheels, respectively.
Figure 12:
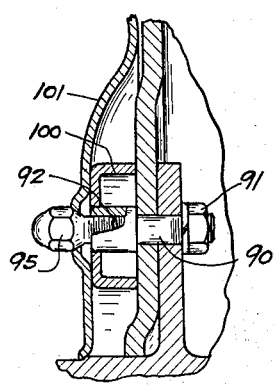
Figure 13:
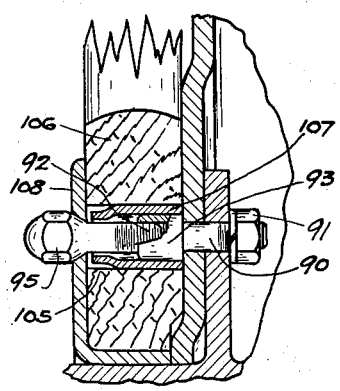

The studs 36 and 41 each comprises a shank 90 which passes through the brake drum and flange on the inner hub and which is threaded at its inner end to receive a nut 91. The stud is enlarged at its outer end and bearing against the outer face of the drum acts with the nut 91 to secure the brake drum in place. An internally threaded depression 92 is formed in the outer end of the stud and when the wheel is assembled in the manner above described has no particular function. If, however, it is desired to secure a wheel of any type by a series of independent bolts, such bolts can be passed through apertures in the wheel and threaded into the depressions 92. Thus in Fig. 11, is illustrated a wire wheel secured in position by bolts 95 passed through apertures 96 in a flange 97 of the hub shell 98. The studs 37 or 42 can also be employed to clamp a disc wheel in position, as shown in Fig. 12, a cup 100 U-shaped in cross section being slipped over the enlarged outer portions 93 of the studs and against which the disc body 101 is clamped by bolts 95. When employing these studs to mount a wooden wheel, as shown in Fig. 13, the aperture 105 of the wood wheel spoke 106 may be provided with a lining 107 which forms an extension of the portion 93 of the stud. Through the flange plate 108 which, in the usual manner, is secured to the spokes of the wheel is passed the bolt 95 to clamp the wooden wheel in position.

In place of the nut 63 having teeth 64 on its outer periphery a nut of the usual non-circular contour, hexagonal or octagonal, for example, may be employed. A nut of that type would be actuated by a wrench or similar tool having a suitably formed nut-engaging member. The contacting faces of the nut and of the flange 60 may be formed as shown in my Patent No. 1,637,248, dated July 26, 1927.

While one embodiment of this invention has been set forth and certain specific details described at length, it will be understood that applicant is not thereby limited to such embodiment and details since other could be made without departing from the spirit and scope of this invention as set forth in the following claims.

I claim:

1. Means for mounting upon a hub, provided with a series of studs, a wheel the hub shell of which has a plurality of perforations through which said studs extend into the interior of the hub shell, comprising a single nut threaded upon the hub within the interior of the shell and having a peripherally arranged row of teeth, means projecting inwardly from the hub shell with which the nut engages whereby the tightening of the nut secures the hub shell upon the hub, means meshing with the teeth on the nut for rotating the same and means normally tending to enter the space between any two adjacent teeth for locking the nut against rotation.

2. A vehicle wheel having in combination, an inner hub, a shell encircling the inner hub and having a flange portion located therewithin and extending inwardly therefrom, means fixed relative to the inner hub and engageable with the flange portion for establishing a driving connection between the shell and inner hub, a nut located within the shell and threaded upon the inner hub intermediate the ends thereof for engaging the front side of the inner end of the flange, means for rotating said nut including a series of circumferentially spaced projections on the periphery of the nut fashioned to engage corresponding projections upon a member insertable into the shell through the front side thereof, means associated with said flange forming a pilot for the member, and means normally preventing accidental rotation of said nut including an element engageable therewith and releasable upon movement of the member into operative relationship with the nut.

JOHN WILLIAM WHITE.